United States Patent [19]

Johner

[11] Patent Number: 4,800,257
[45] Date of Patent: Jan. 24, 1989

[54] OPTOELECTRONIC READING PEN

[75] Inventor: Heinz Johner, Embrach, Switzerland

[73] Assignee: BBC Brown, Boveri & Company, Limited, Baden, Switzerland

[21] Appl. No.: 13,555

[22] Filed: Feb. 11, 1987

[30] Foreign Application Priority Data

Feb. 21, 1986 [CH] Switzerland .............. 689/86

[51] Int. Cl.⁴ ............................. G06K 13/00
[52] U.S. Cl. ................... 235/472; 235/473; 250/227
[58] Field of Search .............. 235/472, 473; 250/227

[56] References Cited

U.S. PATENT DOCUMENTS

| 3,260,849 | 7/1966 | Polye | 250/227 X |
| 3,985,999 | 10/1976 | Yoneyama | 235/473 X |
| 4,528,444 | 7/1985 | Hara et al. | 235/472 X |
| 4,644,155 | 2/1987 | Mochiznki et al. | 235/473 X |

FOREIGN PATENT DOCUMENTS 2271618 12/1975 France .
59-53974 3/1984 Japan .

Primary Examiner—David L. Trafton
Attorney, Agent, or Firm—Oblon, Fisher, Spivak, McClelland & Maier

[57] ABSTRACT

An optoelectronic reading pen for scanning optically encoded information, applied to an information carrier, particularly in the form of a bar or line code, including means for illuminating the information carrier and an optoelectronic sensor which receives the light reflected from the information carrier and converts the reflected light into an electric signal, wherein ambient light from the environment of the reading pen is collected and used for illuminating the information carrier. Thus, the current intake is drastically reduced by the fact that, instead of an internal LED light source, light from the environment is used for illuminating the information carrier.

6 Claims, 1 Drawing Sheet

OPTOELECTRONIC READING PEN

BACKGROUND OF THE INVENTION

1. Field of the Invention

The invention relates to an optoelectronic reading pen for scanning optically encoded information such as in the form of a bar or line code, as is known, for example, from the printed document "Hewlett-Packard Journal", January 1981, pages 3-10.

2. Discussion of Background

Optoelectronic reading pens, which can be used for scanning the optically encoded information, have been successfully used for a relatively long time for rapidly and faultlessly reading in large amounts of data such as are produced, for example, when articles are debited at the cash registers of large deparment stores having EDP-controlled store management.

In this arrangement, bar or line codes according to the UPC (Universal Product Code) or EAN (European Article Numbering) standard are normally used as optical codes.

Known optoelectronic reading pens essentially consist of an optoelectronic system which is accommodated in an elongated pen housing and is followed by a single - processing electronic system. The optoelectronic system comprises a light source, in most cases a light-emitting diode (LED), an optoelectronic sensor (photodiode or phototransistor) and optical devices (lenses or similar) which focus the light of the light source onto a small spot in the plane of scanning and similarly collect the light reflected from the information carrier and conduct it into the sensor.

The wavelength of the light used is either within the visible range (for example 655 nm) or in the infrared range (for example 820 nm). As described in the printed document initially mentioned, light source and sensor can be jointly integrated in one housing. In most cases, inserts of smooth and wear-resistant material are provided at the tip of the reading pen on the scanning side to ensure that the pen slides easily and has a long life.

The light source installed in the known reading pen has a comparatively high power consumption which leads to a current intake of typically 20-50 mA of the complete reading pen. A current intake of this magnitude is uncritical for as long as the reading pen is connected to a stationary mains-operated data processing device.

In contrast, problems arise when the reading pen is connected to small portable battery-operated data acquisition devices in which the power consumption of all system components plays a decisive role with respect to the usefulness and operability of the system.

To reduce the power consumption overall, a momentary-contact switch, with the aid of which the light source is switched on for a brief period only during the actual reading process, is provided in the known reading pen.

However, the momentary-contact switch control of the known reading pen does not lead to significant power saving when the reading pen is almost continuously being used. In addition, the momentary-contact switch makes operation of the reading pen more difficult.

SUMMARY OF THE INVENTION

The present invention has the object of creating an optoelectronic reading pen which is distinguished at the same time by low current intake and ease of handling.

The above object is achieved according to the invention by providing a new and improved optoelectronic reading pen for scanning optically encoded information applied to an information carrier, particularly in the form of a bar or line code, including means for illuminating the information carrier and an optoelectronic sensor which receives the light reflected from the information carrier and converts it into an electric signal, wherein the illuminating means collects light from the surrounding environment and applies the collected light to the information carrier.

The core of the invention consists in saving the internal light source of the reading pen, which consumes much current, completely or at least partially by using light from the environment of the reading pen for illuminating the information carrier during the scanning process.

According to a preferred illustrative embodiment of the invention, a hollow-cylindrical pen housing of optically transparent material is provided for this purpose which collects light from the environment through a rear outer area, conducts it further in the manner of an optical waveguide towards the scanning tip and there concentrates it, for example in a conically tapering part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
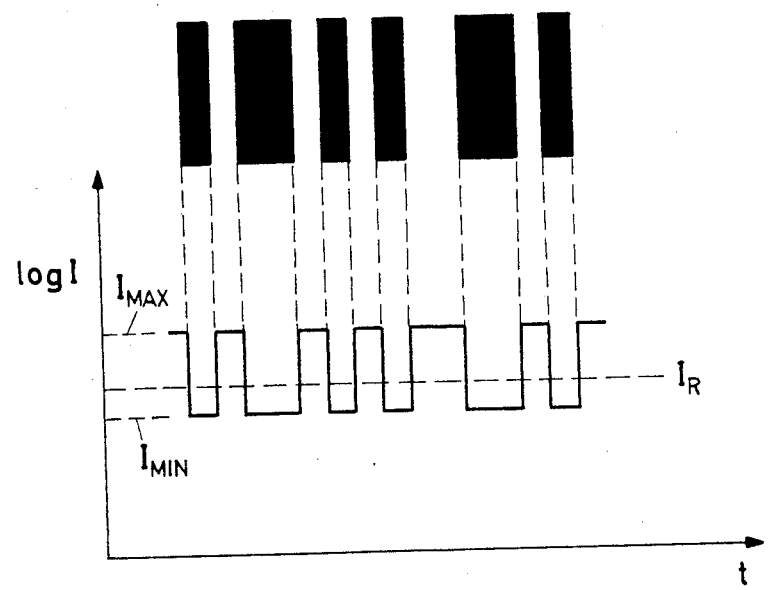
FIG. 1 is a graph illustrating the example of a bar code and the associated variation of the light intensity with time during the uniform scanning of this code.

Referring now to the drawings, in the upper part of FIG. 1, a bar or line code is shown as an example which is characterized by a sequence of black bars or lines of different width and in each case separated by light-colored intermediate spacings. Such a code is to be scanned by means of an optoelectronic reading pen such as is the subject-matter of the invention.

As a rule, scanning proceeds in such a manner that the user of the reading pen moves the pen in a particular direction over the sequence of lines of the code.

If the pen is moved at a uniform rate, it sees, as shown in the lower part of FIG. 1, a time sequence of minima $I_{MIN}$ and maxima $I_{MAX}$ of the light intensity I which correspond to the black bars or the light-colored intermediate spaces. This intensity pattern is detected by an optoelectronic sensor in the reading pen and converted into a corresponding electric signal pattern from which the coded data are then extracted in a signal - processing electronic system.

The ratio between light intensities $I_{MAX}$ and $I_{MIN}$, that is to say the difference in the logarithmic plot of FIG. 1, essentially depends on the optical property of the black bars and of the light-colored intermediate spaces but not on the intensity of the illumination. If the intensity of the illumination changes, therefore, the difference, which remains the same, shifts upwards or downwards on the logarithmic scale depending on whether the intensity of illumination is increasing or decreasing, if the property of the bar code remains the same.

In the known reading pens with internal light source and thus largely constant illumination intensity, a change of the illumination and an associated change in the electric signal quantities does not need to be taken into consideration during the evaluation of the signals.

In a preferred embodiment of the reading pen according to the invention, in contrast, control of the signal amplifier following the optoelectronic sensor in dependence on the brightness in the environment of the reading pen is provided. For this purpose, a reference intensity $I_R$ is needed which, for example, as drawn in dashes in FIG. 1, is between $I_{MIN}$ and $I_{MAX}$ and which will be discussed later in still greater detail.

Figure 2:
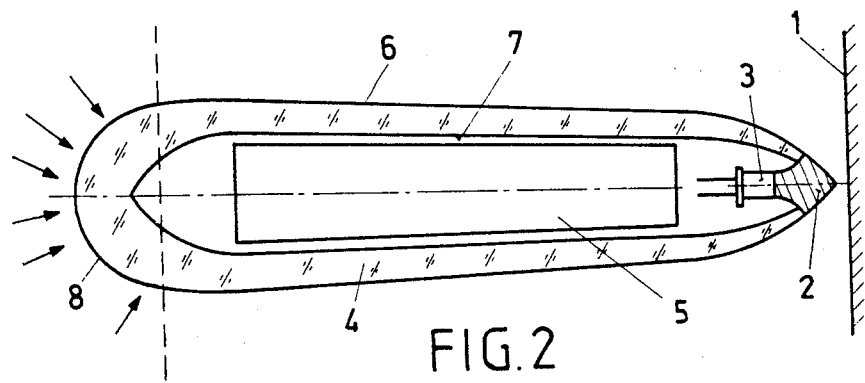
FIG. 2 is a side view, partially in cross-section, of a preferred illustrative embodiment for a reading pen according to the invention.

FIG. 2 shows a preferred illustrative embodiment of the reading pen according to the invention. The reading pen comprises a pen housing 4 of essentially hollow-cylindrical shape which conically tapers, for example towards the scanning tip (towards the right-hand side in FIG. 2). In the example of FIG. 2, the scanning tip itself is formed by a sapphire tip 2 which slides easily and has great strength combined with good optical transparency.

An optoelectronic sensor 3 is adapted to a projection of the sapphire tip 2 located in the interior of the housing and receives the light reflected from the bar code applied to an information carrier 1, which reaches the interior of the pen housing 4 through the sapphire tip 2, and converts it into an electric signal. In the cavity formed by the pen housing 4, a signal-processing electronic system 5 is suitably accommodated which processes the output signals of the optoelectronic sensor 3 in such a manner that the data are available in an EDP-compatible form at the output of the reading pen.

The pen housing 4 itself is made of an optically transparent material. The optical transparency relates to the range of wavelengths which is considered as the working range of the optoelectronic sensor concerned. If the sensor is therefore designed for infrared detection, the material should correspondingly have sufficient optical transparency in the infrared range.

For the visible portion of the spectrum, particularly glass, acrylic glass or polystyrene can be considered as suitable materials for the pen housing. However, mechanical strength must also be taken into consideration if the reading pen is intended, for example, for rough outdoor use.

In its central portion, the pen housing 4 forms a type of optical waveguide in which light, once captured, is conducted further by total reflection. These light-conducting characteristics of the pen housing 4 are preferably supported and improved by the measure that the lateral outside surface 6 and/or the lateral inside surface 7 has at least a polished or better even an additionally mirrored finish.

To receive light from the environment of the reading pen, the rear outside surface 8 of the pen housing is constructed to be hemispherically domed in the example of FIG. 2 and is preferably provided with an optically dull surface in order to be able to receive scattered light as indicated by the arrows in FIG. 2.

As already mentioned, the light received via the rear outside surface 8 approximately up to the vertical dashed line is conducted in the manner of an optical waveguide through the central portion of the pen housing 4 into the conically tapering tip where it is coupled into the sapphire tip 2 and is then used, concentrated onto a small area, for illuminating the lines arranged on the information carrier 1.

Instead of the rear outside surface 8 in the example of FIG. 2, a portion of the lateral outside surface 6 could be used just as well for capturing the environmental light by providing an optically rough surface there instead of a polished and mirrored surface.

Similarly, it is within the scope of the invention to replace the sapphire tip 2 either by a tip of different material or different shape or to leave it out altogether just as long as the tip is optically designed in such a manner that the captured light from the environment is concentrated at the tip onto the area to be scanned and the reflected light is radiated into the optoelectronic sensor 3.

In addition, it is also within the scope of the invention to provide as an aid, in addition to the illumination by environmental light, an additional internal light source as in the known reading pens which is switched on, possibly automatically, only when it is determined by the electronics of the reading pen that the brightness of the environment is not sufficient for enabling the code to be scanned without errors.

In connection with the changing brightness in the environment of the reading pen, the optoelectronic sensor 9, according to another preferred embodiment of the invention (FIG. 3), is followed by a controllable amplifier 10, the gain factor of which is set and readjusted as a function of the brightness. Thus, if, for example, the brightness drops in the environment of the reading pen, the gain factor is correspondingly increased and vice versa.

This automatic control system can be implemented in a simple manner, next described. It has already been pointed out in connection with the explanation for FIG. 1 that the ratio between the intensities $I_{MAX}$ and $I_{MIN}$ remains the same with constant code if the environmental brightness changes but that both values shift by equal distances along the logarithmic scale with brightness. If integration is then carried out over the signal pattern of FIG. 1, a value is obtained for a reference intensity which is between $I_{MIN}$ and $I_{MAX}$ and is directly correlated with the environmental brightness.

Figure 3:
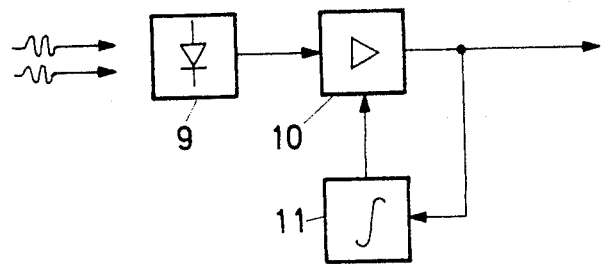
FIG. 3 is a block diagram for a brightness-controlled gain control in a reading pen according to the invention.

For this reason, the amplified output signal of the controllable amplifier 10, which corresponds to the signal pattern of FIG. 1, is supplied to the input of an integrator 11 in the circuit according to FIG. 3. The output signal of the integrator 11 is then conducted further as a reference quantity to the control input of the controlable amplifier 10, for setting and readjusting the gain factor. In this manner, a constant signal level is permanently ensured at the output of the reading pen even if the light conditions change.

Overall, the invention results in an optoelectronic reading pen which is distinguished by extremely low current intake, the simplicity with which it can be produced and the simplicity with which it can be handled.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Optoelectronic reading pen for scanning optically encoded information applied to an information carrier, comprising:
    means for illuminating the information carrier; and
    optoelectronic sensor means for receiving light reflected from the information carrier and converting the received light into an electric signal;
    wherein said illuminating means comprises means for collecting ambient light from the environment and applying the collected light to the information carrier, and ambient light from the environment of the reading pen is exclusively used for illuminating the information carrier;
    said illuminating means comprising means for concentrating collected ambient light prior to application to the information carrier, comprising an essentially hollow-cylindrical pen housing of an optically transparent material, into which pen housing ambient light can enter from the environment through an outside surface, wherein the ambient light entering the pen housing is conducted further towards a scanning side and is there concentrated, said pen housing comprising an optically dull rear outside surface selected as an outside surface for entry of the light.

2. Optoelectronic reading pen as claimed in claim 1, wherein the pen housing is conically tapered towards the scanning side.

3. Optoelectronic reading pen as claimed in claim 1, wherein the pen housing consists of glass, acrylic glass or polystyrene.

4. Optoelectronic reading pen as claimed in claim 1, wherein the housing comprises a light reflecting lateral inside surface and a light reflecting lateral outside surface.

5. Optoelectronic reading pen as claimed in claim 11, comprising:
    means for the processing of the electrical signal produced by the optoelectronic sensor, including a controllable amplifier having a gain factor which is set and readjusted as a function of the brightness of the ambient light in the environment of the reading pen.

6. Optoelectronic reading pen as claimed in claim 5, wherein said processing means comprises:
    an integrator connected to an output of the controllable amplifier for averaging the output of the controllable amplifier, said integrator having an output connected to a control input of the controllable amplifier for setting the gain factor of the controllable amplifier based on the average output of the controllable amplifier.

* * * * *